US007004861B2

(12) United States Patent
Fujiwara

(10) Patent No.: US 7,004,861 B2
(45) **Date of Patent: *Feb. 28, 2006**

(54) PULLEY UNIT

(75) Inventor: Hideki Fujiwara, Kitakatsuragi-gun (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/193,928

(22) Filed: Jul. 12, 2002

(65) Prior Publication Data

US 2002/0183147 A1 Dec. 5, 2002

Related U.S. Application Data

(62) Division of application No. 09/711,800, filed on Nov. 13, 2000, now Pat. No. 6,588,560.

(30) Foreign Application Priority Data

Nov. 19, 1999 (JP) ............................... P11-329430
Nov. 19, 1999 (JP) ............................... P11-329431

(51) Int. Cl.
*F16H 55/36* (2006.01)

(52) U.S. Cl. .......................................... 474/74; 192/45

(58) Field of Classification Search .................. 192/45, 192/110 B; 474/17, 199, 74; 384/449, 546, 384/547, 572, 587, 588
See application file for complete search history.

(56) References Cited

U.S. PATENT DOCUMENTS 1,483,512 A * 2/1924 Hudd ......................... 246/240
3,017,002 A * 1/1962 Marland ...................... 192/45
3,734,582 A * 5/1973 Beauchet .................... 384/492
3,899,225 A * 8/1975 Elmore et al. ............. 384/454
4,327,822 A 5/1982 Vogele et al.
4,391,476 A * 7/1983 Negele et al. .............. 384/494
4,571,227 A * 2/1986 Colanzi et al. ............ 474/199
4,764,154 A * 8/1988 Teramachi .................. 464/168
5,517,957 A * 5/1996 Wagner et al. ........... 123/192.1
5,617,937 A * 4/1997 Zettner et al. ................ 192/45
5,672,110 A * 9/1997 Kurita et al. ................. 464/37
5,675,202 A 10/1997 Zenmei et al.
5,695,031 A * 12/1997 Kurita et al. ................. 192/45
5,938,349 A * 8/1999 Ogawa ....................... 384/615
5,996,753 A * 12/1999 Temme et al. ................ 192/45
6,095,301 A * 8/2000 Fujiwara et al. .............. 192/45
6,588,560 B1 * 7/2003 Fujiwara ...................... 192/45
6,830,137 B1 * 12/2004 Fujiwara ...................... 192/45
2002/0134974 A1 * 9/2002 Fujiwara et al. ............ 254/391

FOREIGN PATENT DOCUMENTS

| | | |
|---|---|---|
| DE | 198 43 946 | 3/1999 |
| EP | 0 947 721 | 10/1999 |
| FR | 2 774 446 | 8/1999 |
| JP | 11-63170 | 3/1999 |

* cited by examiner

*Primary Examiner*—Vicky A. Johnson
(74) *Attorney, Agent, or Firm*—Jordan and Hamburg LLP

(57) ABSTRACT

A pulley unit improved in axial positioning of a cage of a one-way clutch is provided. An outer radius of an orbital portion of inner rings of two rolling bearings disposed at both axial sides of the cage are designed to be larger than an inner radius of the cage, so that axial movement of the cage is constrained. Due to this structure, projecting and recessing portions disposed on the cage of the one-way clutch and on an inner ring become unnecessary and can be eliminated.

16 Claims, 7 Drawing Sheets

F I G. 3
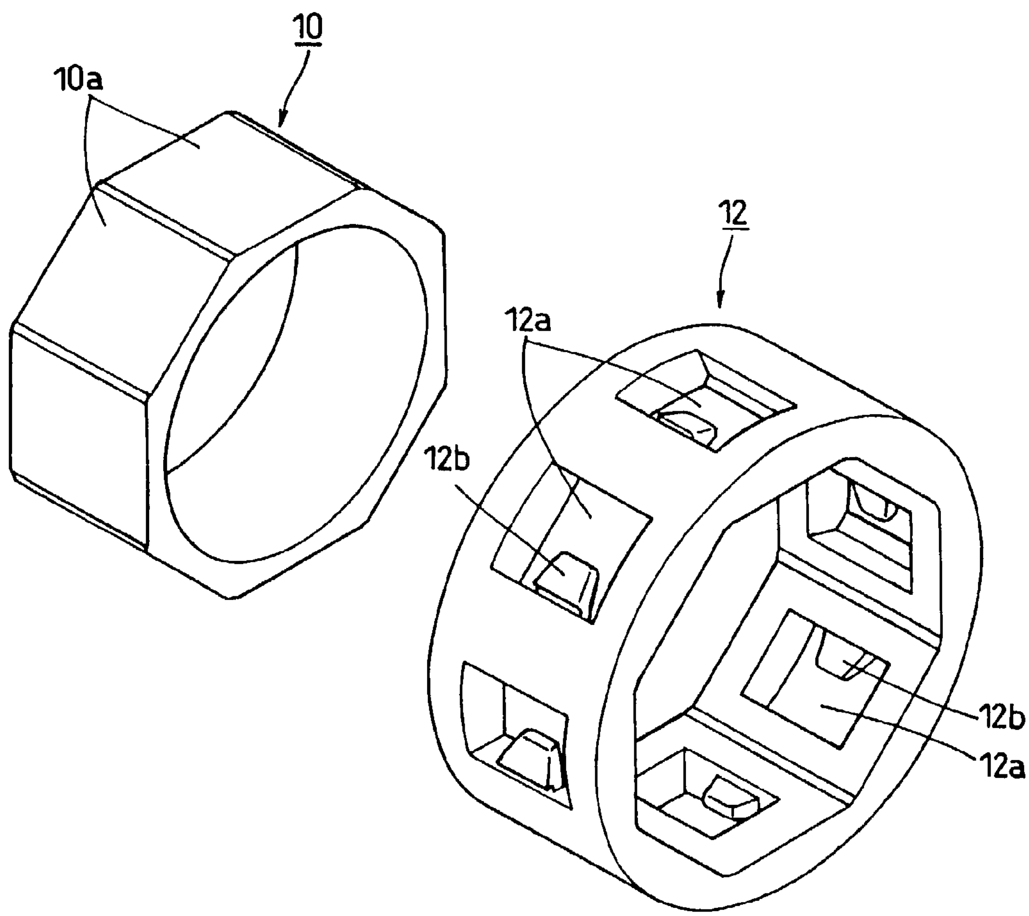

F I G. 4
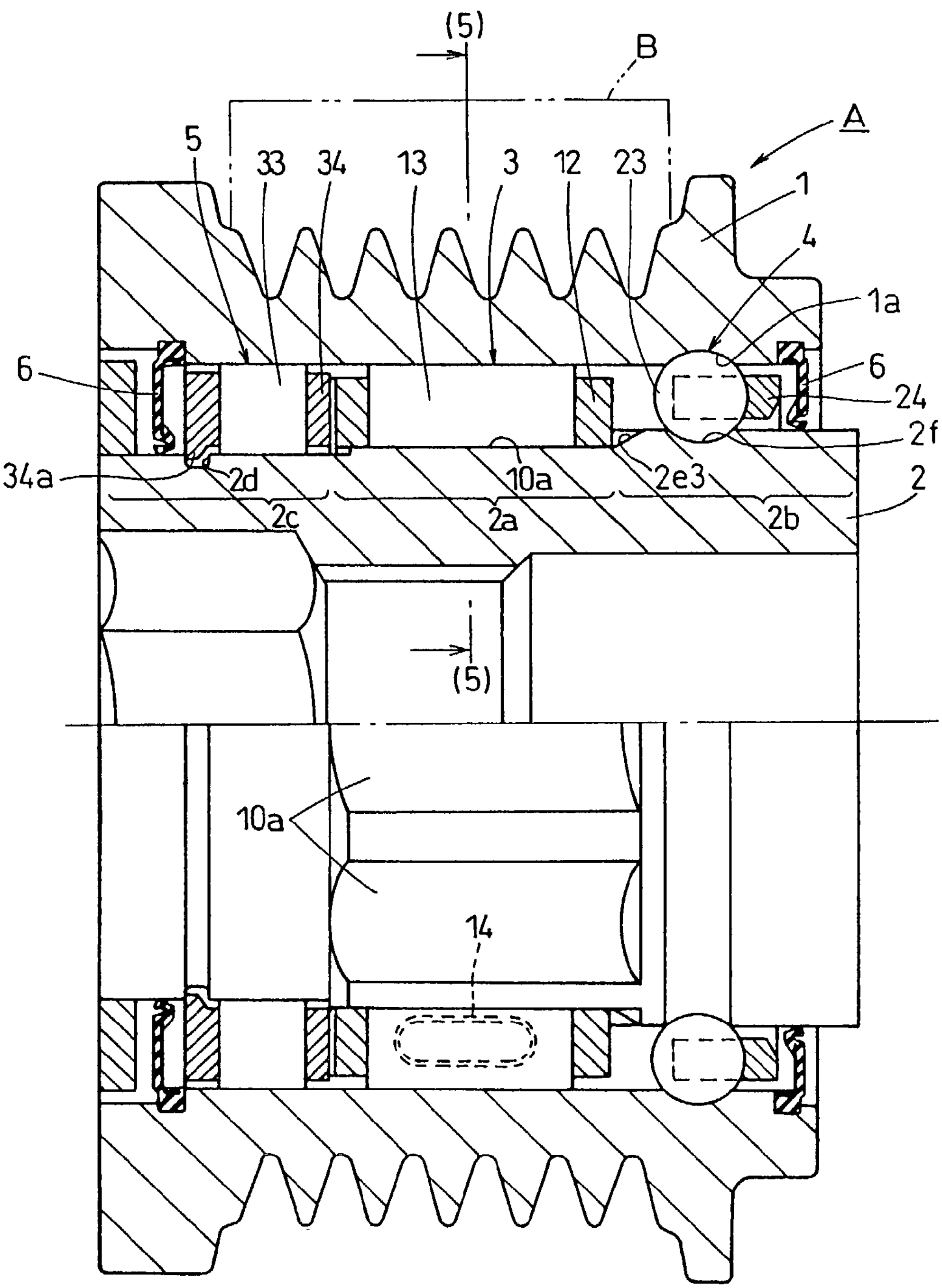

F I G. 6
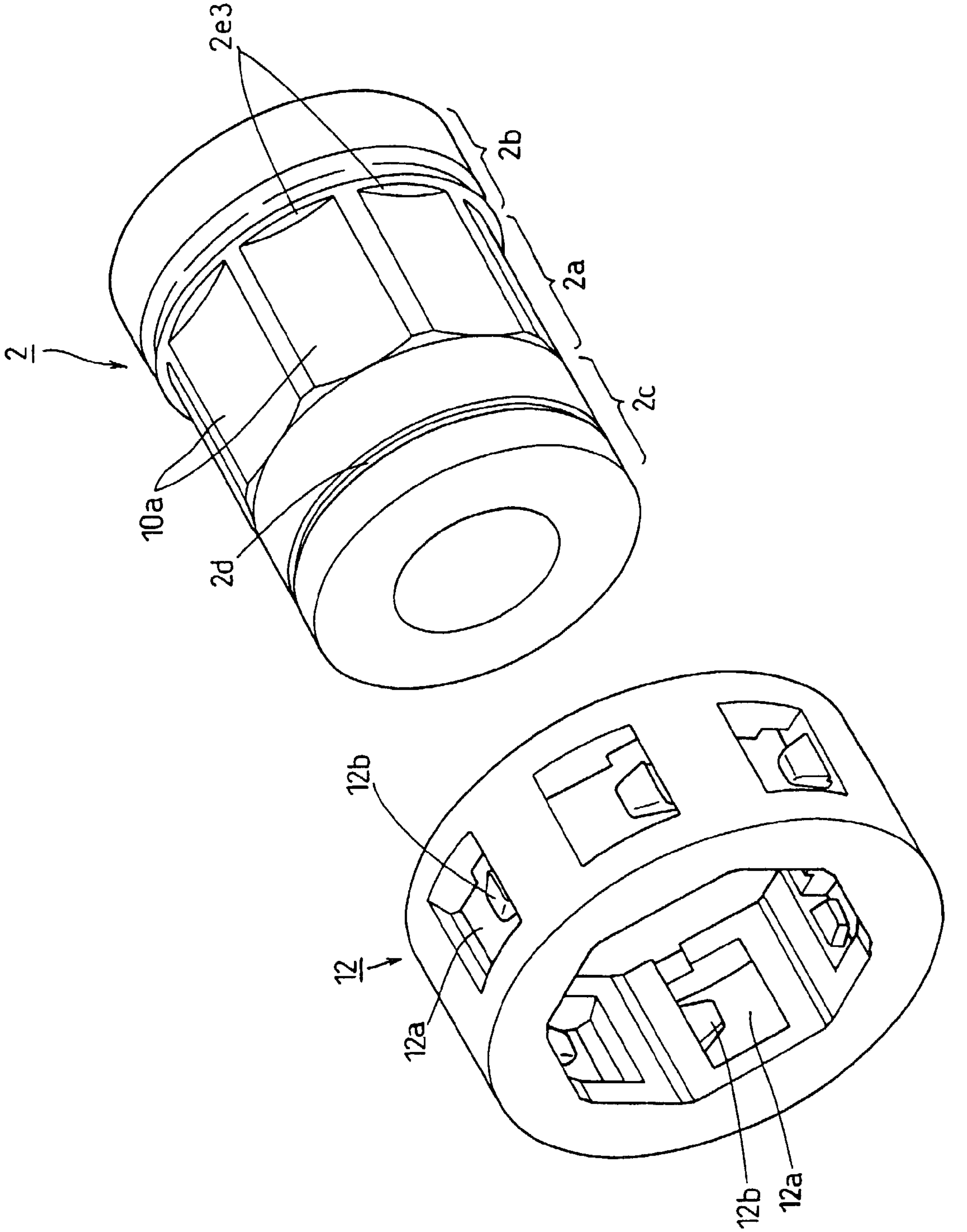

F I G. 9
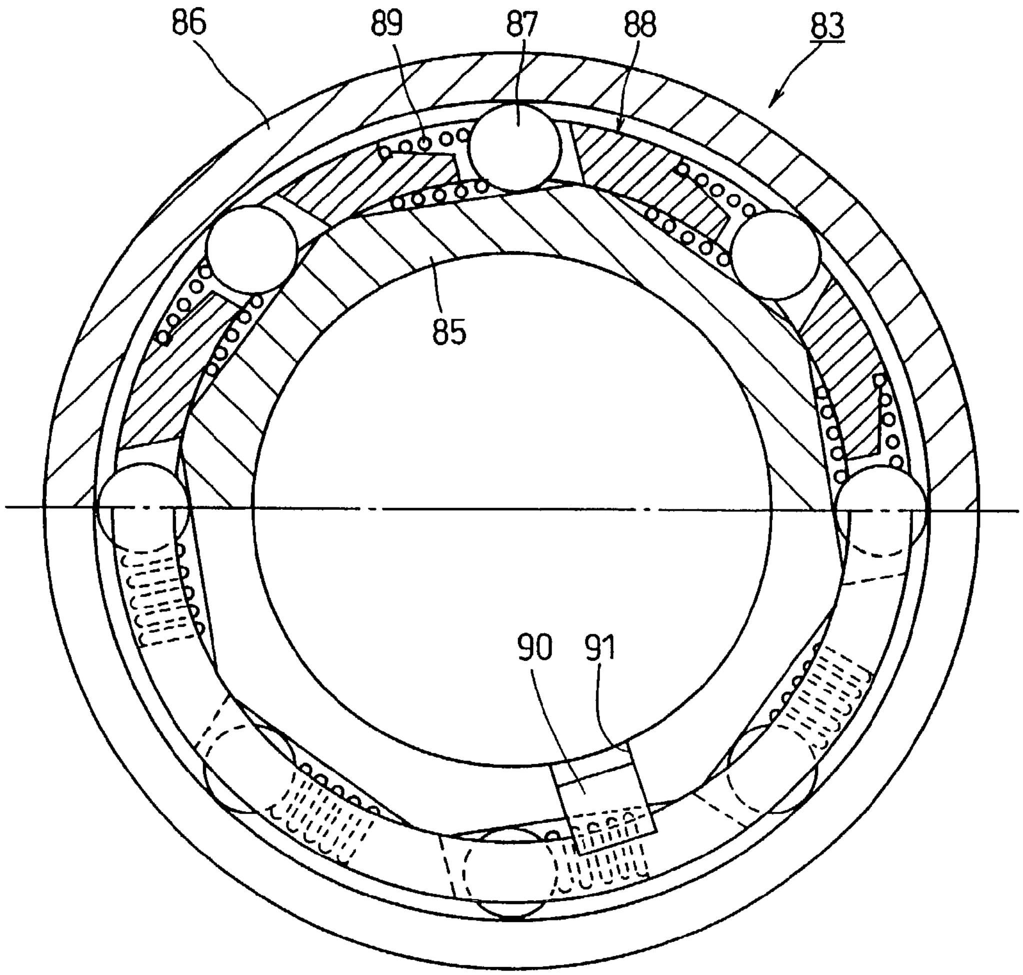

PULLEY UNIT

BACKGROUND OF THE INVENTION

1. Field of the Invention

The present invention relates to a pulley unit to be mounted in an auxiliary device, which is a device driven by a belt combined with a crank shaft of an engine of a vehicle, for example. Examples of such an auxiliary device are a compressor for an air conditioner, a water pump, an alternator, and a cooling fan of a vehicle, for example.

2. Description of the Related Art

An example of such a pulley unit in the prior art is shown in FIGS. 8 and 9. In those figures, reference numerals 81, 82, 83 and 84 denote, respectively, a pulley, a shaft, a one-way clutch and a rolling bearing. The one-way clutch 83 has an inner ring 85, an outer ring 86, a plurality of rollers 87, cage 88 and a coil spring 89.

When the cage 88 in such a one-way clutch 83 jolts in the angular and/or axial direction with respect to the inner ring 85, the functions of the locking in and the releasing free of the one-way clutch 83 tend to be unstable. Therefore, two radially inward directed projections 90, 90 having different angular positions are provided on one of the shaft ends of the cage 88, and two slits 91, 91 having different angular positions are provided on one of the ends of the inner ring 85; the projections 90, 90 and the slits 91, 91 are engaged with each other in the axial direction thereof so that the cage 88 is positioned exactly at a predetermined position in the angular direction and in the axial direction with respect to the inner ring 85 in order to prevent such instability.

There is room for improvement in the positioning of the cage 88 in the one-way clutch 83 in the prior art.

In the prior art, the inner ring 85 is forced fit around the shaft 82 by force so that the rotation around the shaft is prevented. However the forced fitting causes a stress acting to the inner ring 85 in the angular direction. The stress tends to concentrates to the inner corner of the slits 91, 91 of the inner ring 85. Thus there is danger of cracking of the inner ring 85 starting from the stress concentrated point.

Other problems are the low efficiency of the working to form the slits 91, 91, and the necessity of the treatment afterward for removing burr. Therefore the fabrication cost is expensive.

SUMMARY OF THE INVENTION

A primary object of the present invention is to provide a pulley unit, comprising the structure of the axial positioning of the cage of the one-way clutch, which has no structurally fragile portion while achieving a simplified fabrication procedure.

Other objects, features, and advantages of the present invention will be apparent from the following description.

The pulley unit according to the present invention includes: an inner shaft, an external ring disposed concentrically around the inner shaft, and a one-way clutch disposed in an annular space between the inner shaft and the external ring having a plurality of rollers, and two rolling bearings disposed in the annular space; each of the rolling bearings is fixed in the axial direction respectively at each side of the one-way clutch; the one-way clutch comprises a cage for constraining the rolling region of the plurality of the rollers; the inner diameter of the cage is designed to be smaller than that of the orbital portion of the inner ring of one of the rolling bearing.

Due to the structure according to the present invention, the movement of the cage in the pulley unit is constrained in an axial direction, without using the recessing and projecting portions for constraining such a movement, which are disposed in the cage and the inner ring of the pulley unit in the prior art. Therefore, the structure of the pulley unit can be simplified and structurally fragile portions can be eliminated. Moreover, the fabrication processes to form such recessing and projecting portions can be omitted, thus the fabrication cost can be reduced.

The inner diameter of the cage according to the present invention is, preferably, smaller than the outer diameter of the inner ring orbital portion of the other rolling bearing. Due to such a structure, the movement of the cage is constrained in both of the axial directions.

BRIEF DESCRIPTION OF THE DRAWINGS

These and other objects as well as advantages of the invention will become clear by the following description of the preferred embodiments of the present invention with reference to the accompanying drawings, wherein:

FIG. 3 is a perspective view showing the inner ring and the cage of a one-way clutch;

FIG. 4 is a longitudinal cross sectional view of another preferred embodiment of the pulley unit according to the present invention;

FIG. 6 is a perspective view showing the inner ring and the cage of a one-way clutch;

FIG. 9 is a cross sectional view of FIG. 8 shown along the line (9)—(9) seen in the direction of the arrows.

In all these figures, like components are indicated by the same reference numerals.

DETAILED DESCRIPTION OF THE INVENTION

Figure 1:
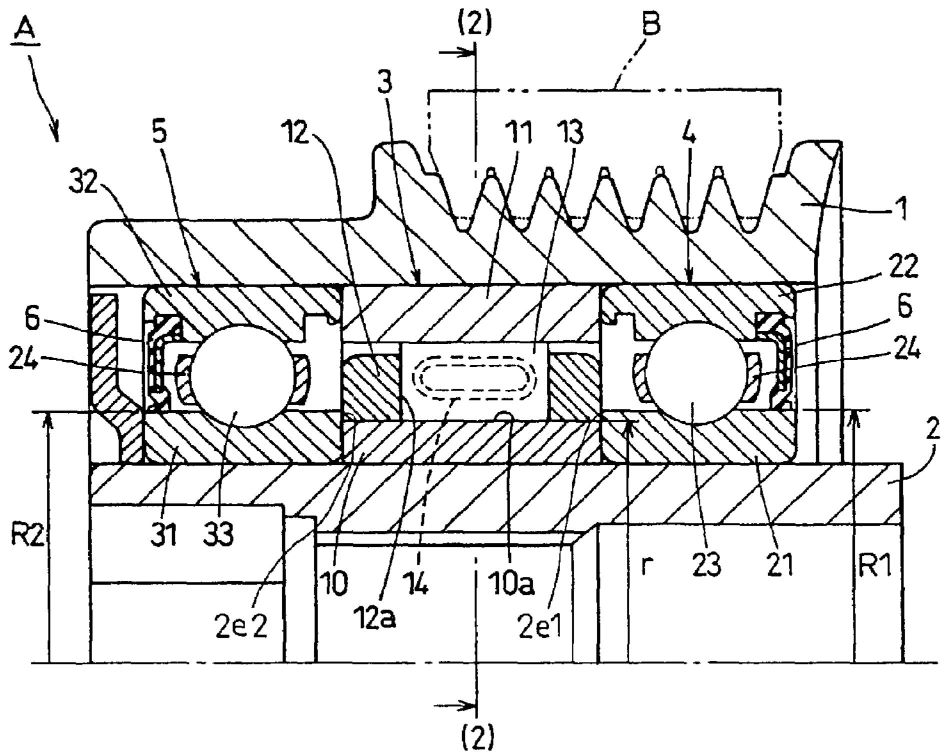
FIG. 1 is a longitudinal cross sectional view of an upper portion of a preferred embodiment of the pulley unit according to the present invention.
Figure 2:
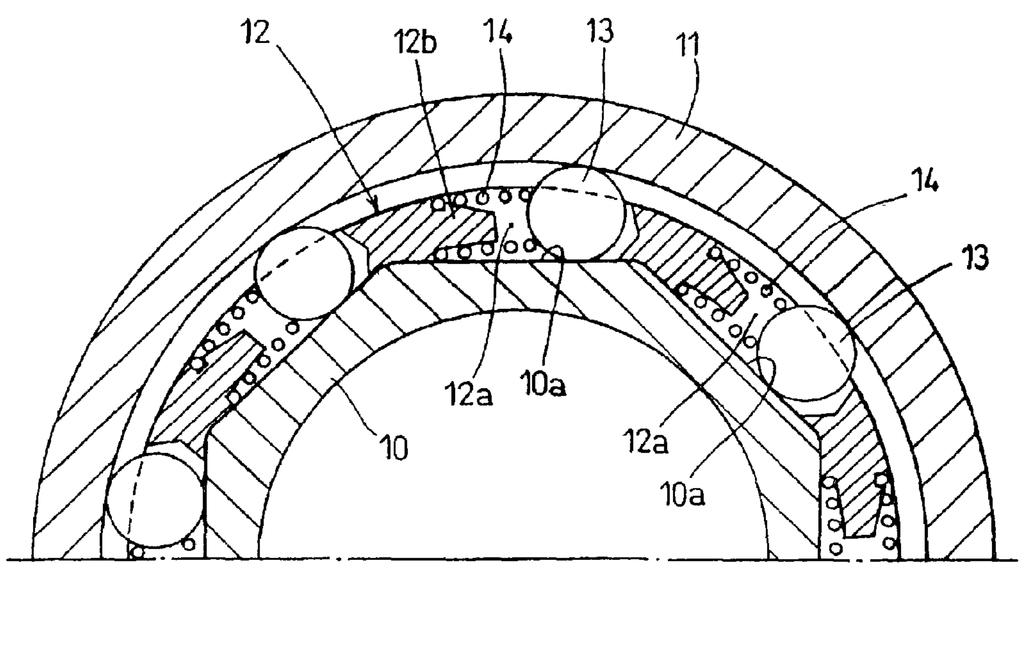
FIG. 2 is a cross sectional view of FIG. 1 shown along the line (2)—(2) seen in the direction of the arrows.

A preferred embodiment of the present invention is explained bellow, referring to FIGS. 1 to 3.

The pulley unit A comprises a pulley 1, a hollow shaft 2, a one-way clutch 3 and two rolling bearings 4 and 5.

The pulley 1, which is an example of the external ring, has an undulated groove on the peripheral surface, for putting a V ribbed belt B. The pulley 1 is rotatably driven by the V ribbed belt B combined with a crank shaft of an engine of a vehicle, for example.

The hollow shaft 2, which is an example of the inner shaft, is inserted into the inner side of the pulley 1 and is fixed to an input shaft of an auxiliary device of a vehicle engine (not shown), e.g., rotor of an alternator.

The one-way clutch 3 comprises an inner ring 10, an outer ring 11, a synthetic resin ring cage 12, a plurality of rollers 13 and an elliptic coil spring 14 as a resilient member. The owe-way clutch 3 is disposed at the center of the opposed annular space between the pulley 1 and the hollow shaft 2.

Two rolling bearings 4, 5 are disposed in the annular space between the pulley 1 and the hollow shaft 2 at both sides of the one-way clutch 3 in the axial direction.

The rolling bearings 4, 5 are general type deep groove ball bearings, and comprise respectively an inner ring 21, 31, an outer ring 22, 32, a plurality of rollers 23, 33 and a synthetic resin ring cage 24, 34. Seals 6 are disposed at an outer end of the respective rolling bearings 4, 5 in the axial direction.

Alternately, the rolling bearings 4, 5 can be angular ball bearings, roller bearings or tapered roller bearings.

The one-way clutch 3 comprises an inner ring 10, an outer ring 11, a cage 12, a plurality of rollers 13 and a plurality of coil springs 14.

The inner ring 10 is forced fit onto the outer peripheral of the hollow shaft 2. A plurality of flat key type cam surfaces 10*a* having different angular positions are disposed on the outer peripheral of the inner ring 10. The number of the cam surface 10*a* is eight in this example, hence, the outer form of the inner ring 10 is an octahedron.

The outer ring 11 is forced fit into the inner surface of the pulley 1. The inner surface of the outer ring 11 is formed as a cylinder.

The cage 12 is disposed in the annular space between the inner ring 10 and the outer ring 11, and is positioned in the angular direction and the axial direction with respect to the inner ring 10. The inner side of the cage 12 contacts with the orbital portion of the inner ring 10. A plurality of pockets 12*a* having different angular positions are disposed in the cage 12 at regions corresponding to the respective cam surfaces 10*a* of the inner ring 10. The pockets 12*a* penetrate the cage 12 in the radial direction. A projecting portion 12*b* is disposed on the inner surface of each pocket 12*a*.

Each of the pockets 12*a* is provided with a roller 13 one by one, and the rolling region of the rollers 13 is constrained in the angular direction.

A coil spring 14 is disposed in each of the pockets 12*a* at the projecting portion 12*b*. The coil spring 14 urges the roller 13 toward a confined wedge space (locking side) between the cam surface 10*a* and the inner surface of the outer ring 11.

The function of the pulley unit A is explained below.

When the relative rotation velocity of the pulley 1 is higher than that of the hollow shaft 2, the roller 13 of the one-way clutch 3 roles in the confined wedge space, which leads to a locking state. As a result, the pulley 1 and the hollow shaft 2 aggregate to each other to be one body and rotate with synchronism.

On the other hand, when the relative rotation velocity of the pulley 1 is slower than that of the hollow shaft 2, the roller 13 of the one-way clutch 3 roles in the wider wedge space, which leads to a free state. As a result, the transmission of rotation power from the pulley 1 to the hollow shaft 2 is cut off. After this cutting off of the rotation power transmission, the hollow shaft 2 continues to rotate only by its rotational inertia.

When such a pulley unit A is applied to an alternator of an engine of a vehicle, the rotation of the rotor of the alternator can be maintained at a high level, irrespective to the fluctuation of the rotation of the crank shaft, which is the power source of the belt B. Therefore, the electric power generating efficiency can be increased.

Namely, when the rotation velocity of the crank shaft increases, the one-way clutch 3 is in the locking state, and the hollow shaft 2 and the pulley 1 rotate with synchronism. On the other hand, when the rotation velocity of the crank shaft decreases, the one-way clutch 3 is in the free state, and the hollow shaft 2 continues to rotate by its own rotational inertia, irrespective to the decrease of the rotational velocity of the pulley 1.

The axial positioning of the cage 12 in the one-way clutch 3 is explained below.

The inner surface of the cage 12 is formed so as to fit to the outer surface of the inner ring 10. Therefore, the angular rotation of the cage 12 with respect to the inner ring 10 is hindered.

The outer radius r of the inner ring 10 of the one-way clutch 3, namely, the inner radius r of the cage 12 is designed to be smaller than the outer radii R1, R2 of the orbital portion of each of the inner rings 21, 31 of the rolling bearings 4, 5.

As a result, stepping walls 2*e*1, 2*e*2 appear at both sides of the cage 12, which constrain the axial movement of the cage 12 in both axial directions.

According to the aforementioned embodiment of the present invention, it is not necessary to form projecting portions and recessing portions in the cage 12 and the inner ring 10. Such portions are necessary for the pulley unit in the prior art, for constraining the movement in both axial directions. Therefore, according to the present invention, the structure of the cage 12 and the inner ring 10 can be simplified, and the structurally fragile portions can be eliminated. Therefore, the fabrication cost can be reduced.

Figure 5:
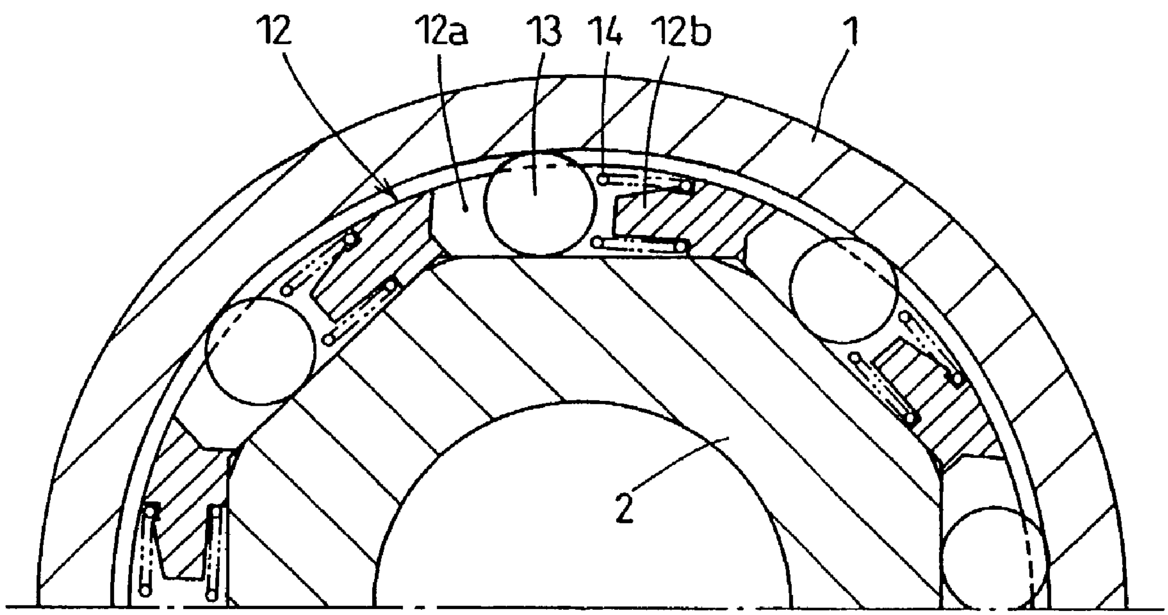
FIG. 5 is a cross sectional view of FIG. 4 shown along the line (5)—(5) seen in the direction of the arrows.

A pulley unit according to another preferred embodiment of the present invention is explained below, referring to FIGS. 4 to 6.

In this embodiment, the inner and outer rings 10, 11 of the one-way clutch 3 and the inner and outer rings 21, 31, 22, 32 of the rolling bearings 4, 5 are removed from the pulley unit A so as to decrease the number of the fabrication parts and to reduce the fabrication cost.

The orbital portions of the inner rings 21, 31 are constituted of the outer surface of the hollow shaft 2, and the orbital portions of the outer rings 22, 32 are constituted of the inner surface of the pulley 1.

One rolling bearing 4 is a deep groove type ball bearing having a plurality of balls 23 and a crown formed cage 24 for holding the balls 23, and the other rolling bearing 5 is a cage-and-roller type bearing having a plurality of rollers 33 and a cage 34 for holding the rollers 33.

The forms of the pulley 1 and the hollow shaft 2 are explained below.

The hollow shaft 2 is divided into three axial zones: a central zone 2*a* and two end zones 2*b*, 2*c* at both sides of the central zone 2*a* in the axial direction.

On the outer surface of the central zone 2*a* of the hollow shaft 2, a plurality of cam surfaces 10*a* having different angular position are formed so as to form an octahedron cross section. The cam surfaces 10*a* form the orbital portion of the inner ring of the one-way clutch 3. On the other hand, the outer surfaces of the hollow shaft 2 in the side zones 2*b*, 2*c* is circular, forming the orbital portions of the inner rings of the rolling bearings 4, 5. The outer radius in one end zone 2*b* of the hollow shaft 2 is designed to be larger than that in the other end zone 2*c*. This structure facilitates the subsequent assemblage of the rolling bearing 4, 5 and one-way clutch 3 into the space between the pulley 1 and the hollow shaft 2 from one side of the hollow shaft.

In addition the outer radius of each of the orbital portions of the inner rings is designed so as to decrease in steps in order toward the rolling bearing 5. This results in that it is made possible to smoothly form the hollow shaft 2 by plastic deformation such as cold forging or drawing.

Raceways 1a, 2f are disposed on the outer surface of the hollow shaft 2 in the end zone 2b and on the corresponding inner surface of the pulley 1 respectively, and balls 23 of the rolling bearing 4 are disposed therebetween.

A peripheral groove 2d is disposed on the outer surface of the hollow shaft 2c in the end zone 2c and a corresponding ring projection 34a is disposed on the inner surface of the cage 34 of the rolling bearing 5. The ring projection 34a engages into the peripheral groove 2d. The cage 34 of the rolling bearing 5 is axially positioned by this engagement.

The cage 12 of the one-way clutch 3 is formed to be an octahedron, fitting with the outer form of the hollow shaft 2 in the central zone 2a. Thus, the cage is held, holding the rollers 13, so that the rotation of the cage 12 around the hollow shaft 2 is hindered, The radius of the maximum radius portion of the cam surface 10a, and hence the inter-cam surface diameter of areas between the cam surfaces 10a, is substantially identical to the radius of the orbital portion of the inner ring of the rolling bearing 4. And the radius of the minimum radius portion of the cam surface 10a is substantially identical to the radius of the orbital portion of the inner ring of the rolling bearing 5.

Therefore, the inner radius of the inner ring of the one-way clutch 3, namely the inner radius of the cage 12, is smaller than the outer radius of the orbital portion of the inner ring of the rolling bearing 4. As a result, a step wall 2e3 is formed at a side of the cage 12 of the one-way clutch 3 in the axial direction. The step wall constrains the axial movement of the cage 12 in one direction.

By the way, the axial movement of the cage 12 of the one-way clutch 3 in the other direction is constrained by the cage 34 of the rolling bearing 5.

It will be apparent from the aforementioned description that the axial movement of the cage 12 of the one-way clutch 3 can be constrained in both axial directions without using any projecting portion and recessing portion, thus a structurally fragile portion can be eliminated and the fabrication cost can be reduced.

The inner ring 10 of the one-way clutch 3 in the pulley unit A shown in FIGS. 1 to 4 can be fabricated as follow.

The material of the inner ring 10 shall be selected from a group of low carbon steel. So-called case hardening steel, such as SCr415 regulated in JIS (Japanese Industrial Standards), is preferable for such low carbon steel. The cam surface 10a shall be formed on the outer surface of a cylindrical low carbon steel material, by plastic deformation, for example, by cold forging or drawing. Then, the outer surface of the inner ring 10 shall be cemented and be polished.

In other words, using a material, the plastic deformation of which is relatively easy, the plurality of the cam surface 10a on the outer surface of the inner ring 10 can be formed by the cold forging or drawing.

In the cold forging or drawing process, a plurality of cam surfaces 10a are simultaneously formed on the outer surface of the inner ring 10 by plastic deformation. On the other hand, the plurality of cam surfaces 10a are made one after another by lathe cutting in the prior art. Thus, the working process for fabricating the cam surface 10a in the present invention is simplified compared to the prior art. Therefore the productivity is increased. Moreover, each cam surface 10a can be formed with high preciseness positioning.

The wear resistance can be increased by the cementation to harden the cam surface 10a formed by the cold forging or drawing process.

Nevertheless the inner ring 10 of the one-way clutch 3 can have a form of a high preciseness, its fabrication cost can be lowered.

By the way, in the cementation of the inner ring 10, a local cementation of the outer surface of the inner ring 10 is preferable. The reason is that when the inner surface of the inner ring 10 is cemented, its threaded portion 25, shown in FIG. 1, will be simultaneously cemented. In such a case, a problem of a hydrogen shortness arises. Therefore a masking of the threaded portion 25 is necessary.

Figure 7:
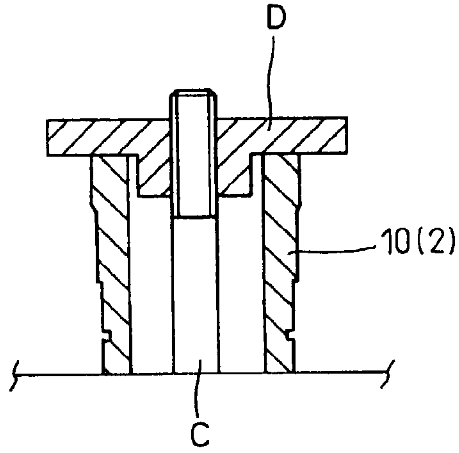
FIG. 7 shows an example of masking of the hollow shaft of the pulley unit shown in FIG. 4 in the carburization treatment.
Figure 8:
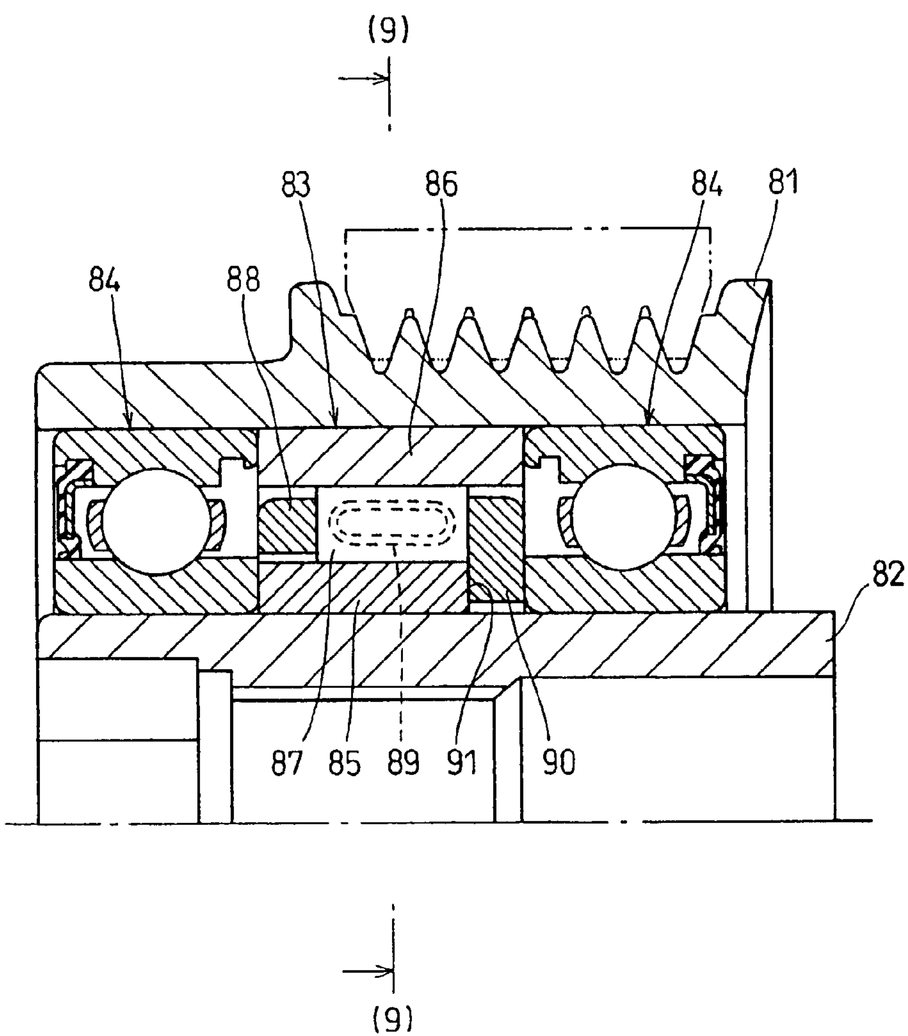
FIG. 8 is a longitudinal cross sectional view of the upper portion of the pulley unit in the prior art.

FIG. 7 shows an example of the masking for a local cementation, performed by carburization treatment, for example as recited in the description of FIG. 7, which masking allows the cementation of only on the outer surface of the inner ring 10. An inner ring 10 is set around the peripheral of a supporting stay shaft C. A closing cover D is screwed with an end of the supporting stay shaft C so that both of the axial ends and the center hole of the inner ring 10 can be masked from the exterior, and only the outer surface of the inner ring 10 is exposed to the exterior.

Alternately, the hollow shaft 2 in the pulley unit A shown in FIG. 4 can be fabricated as follow.

The material of the hollow shaft 2 shall be selected from a group of low carbon steel. The hollow shaft 2 shall be formed from a low carbon steel material by cold forging or drawing. The cementation of the outer surface of the hollow shaft 2 is preferable. So-called case hardening steel, e.g., SCr415 regulated in JIS (Japanese Industrial Standards), is preferable for such low carbon steel.

In the cold elastic deformation, a plurality of the cam surfaces 10a and orbital portions for the rollers can be simultaneously formed by plastic deformation of the outer surface of the hollow shaft 2. On the contrary, in the prior art, the plurality of can surfaces 10a and orbital portions are made one after another by lathe cutting. Thus, the working process for fabricating the cam surface 10a and the orbital portions for the rollers can be simplified in the present invention compared to the prior art. Therefore the productivity can be increased.

A problem of the low wear resistance may arise, when a low carbon steel material is used. The wear resistance can, however, be increased by the cementation to harden the surface of the outer surface of the hollow shaft 2 after the cold elastic deformation. Using such a hollow shaft 2 having a high preciseness and formed inexpensively, it will be advantageous to lower the fabrication cost of the pulley unit A and to ameliorate the product quality.

By the way, a local cementation of the outer surface of the hollow shaft 2 is preferable, due to the same reason as in the case of the inner ring 10. Therefore, a masked cementation of the hollow shaft 2, as shown in FIG. 7, is preferable.

While there has been described what is at present considered to be preferred embodiments of this invention, it will be understood that various modification may be made therein, and it is intended to cover in the appended claims all such modifications as fall within the true spirit and scope of this invention.

What is claimed is:

1. A pulley unit comprising:

a hollow shaft;

an outer ring member disposed concentrically about said hollow shaft and defining an annular space therebetween;

a one-way clutch interposed in said annular space between said hollow shaft and said outer ring member;

a ball bearing disposed in said annular space at one side of said one-way clutch; and a roller bearing disposed in said annular space at another side of said one-way clutch;

wherein:

said hollow shaft is formed as an inner ring of each of said one-way clutch, said ball bearing and said roller bearing, said hollow shaft has a first outer surface region formed as the inner ring of said ball bearing, said first outer surface region having an inner raceway shaped as a groove in said first outer surface region in which balls of said ball bearing roll and a shoulder having a first diameter, said hollow shaft has a second outer surface region formed as said inner ring of said one-way clutch having cam surfaces, a second diameter corresponding to an inner diameter of said cam surfaces, and an inter-cam surface diameter, defined by inter-cam surface regions circumferentially interposed between said cam surfaces, which is greater than said second diameter, said hollow shaft has a third outer surface region formed as said inner ring of said roller bearing, said third outer surface region having a third diameter corresponding to a diameter of an inner raceway of said roller bearing, said first diameter is greater than said second diameter, and said second diameter is not less than said third diameter, and said inter-cam surface diameter is substantially equal to said first diameter of said shoulder of said ball bearing, said second diameter is substantially equal to said third diameter of said inner ring of said roller bearing, said hollow shaft is formed by plastic processing and said outer surface of said hollow shaft is cemented and said hollow shaft has a threaded portion on an inner surface of said hollow shaft which is protected from cementation and thereby not cemented; and said first, second and third outer surface regions adjoin one another and no portions of said first, second and third outer surface regions have an increasing radius in a direction from said groove of said first outer surface region to a further area of contact of rollers of the roller bearing of said third outer surface region.

2. The pulley unit according to claim 1, wherein said cam surfaces define a wedge shaped spaces between said hollow shaft and said outer ring member.

3. The pulley unit according to claim 2, wherein said outer ring member is formed as a pulley and an outer ring of each of said one-way clutch, said first rolling bearing and said second rolling bearing.

4. The pulley unit according to claim 1, wherein said outer ring member is formed as a pulley and an outer ring of each of said one-way clutch, said first rolling bearing and said second rolling bearing.

5. The pulley unit according to claim 1 wherein said hollow shaft is cemented by carburizing.

6. The pulley unit according to claim 1 further comprising inclined step surfaces extending from said cam surfaces to said shoulder of said first outer surface region with said inter-cam surface regions circumferentially interposed between said step surfaces.

7. A pulley unit comprising:

a hollow shaft;

an outer ring member disposed concentrically about said hollow shaft and defining an annular space therebetween;

a one-way clutch interposed in said annular space between said hollow shaft and said outer ring member;

a ball bearing disposed in said annular space at one side of said one-way clutch; and a roller bearing disposed in said annular space at another side of said one-way clutch;

wherein:

said hollow shaft is formed as an inner ring of each of said one-way clutch, said ball bearing and said roller bearing;

said hollow shaft has a first outer surface area at a first axial position of said hollow shaft at said one side of said one-way clutch, and said first outer surface area includes an inner raceway of said ball bearing and has a first outer radius corresponding to a shoulder of said inner raceway and a groove in which balls of said ball bearing roll, said hollow shaft has a second outer surface area at a second axial position of said hollow shaft at said another side of said one-way clutch, said second outer surface area has a second outer radius, smaller than said first outer radius, and includes an inner raceway of said roller bearing;

said hollow shaft has a third outer surface area at a third axial position corresponding to said inner ring of said one-way clutch and having cam surfaces defining an inner radius which is less than said first outer radius and not less than said second outer radius, an inter-cam surface radius defined by inter-cam surface regions circumferentially interposed between said cam surfaces, and said inter-cam surface radius being greater than said inner radius and substantially equal to said first outer radius of said shoulder of said ball bearing;

said inner radius of said cam surfaces is substantially equal to said second outer radius of said second outer surface are including said inner raceway of said roller bearing;

said hollow shaft is formed by plastic processing and said outer surface of said hollow shaft is cemented; and said first, second and third outer surface areas adjoin one another and no portions of said first, second and third outer surface areas have an increasing radius in a direction from said groove of said first outer surface region to a further area of contact of rollers of the roller bearing of said third outer surface region.

8. The pulley unit according to claim 7, wherein said cam surfaces define wedge shaped spaces between said hollow shaft and said outer ring member.

9. The pulley unit according to claim 8, wherein said outer ring member is formed as a pulley and an outer ring of each of said one-way clutch, said first rolling bearing and said second rolling bearing.

10. The pulley unit according to claim 7, wherein said outer ring member is formed as a pulley and an outer ring of each of said one-way clutch, said first rolling bearing and said second rolling bearing.

11. The pulley unit according to claim 7, further comprising said hollow shaft having an inner surface provided with a threaded portion which is protected from cementation processing carried out on said outer surface of said hollow shaft so the threaded portion of an inner surface of said hollow shaft is not cemented.

12. The pulley unit according to claim 11, further comprising a cam surface disposed on a portion of said outer surface of said hollow shaft in which said one-way clutch is disposed so that a wedge shaped space is formed between said hollow shaft and said outer ring member.

13. The pulley unit according to claim 12, wherein said outer ring member is formed as a pulley and an outer ring of each of said one-way clutch, said first rolling bearing and said second rolling bearing.

14. The pulley unit according to claim 11, wherein said outer ring member is formed as a pulley and an outer ring of each of said one-way clutch, said first rolling bearing and said second rolling bearing.

15. The pulley unit according to claim 7 wherein said hollow shaft is cemented by carburizing.

16. The pulley unit according to claim 7 further comprising inclined step surfaces extending from said cam surfaces to said shoulder of said inner raceway of said ball bearing with said inter-cam surface regions circumferentially interposed between said step surfaces.

* * * * *